United States Patent
Klose et al.

(10) Patent No.: US 9,024,744 B2
(45) Date of Patent: *May 5, 2015

(54) SMART PHONE CONTROL AND NOTIFICATION FOR AN ELECTRIC VEHICLE CHARGING STATION

(71) Applicant: Bosch Automotive Service Solutions LLC, Warren, MI (US)

(72) Inventors: Lee Robert Klose, Portage, MI (US); William Wittliff, III, Gobles, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/149,414

(22) Filed: Jan. 7, 2014

(65) Prior Publication Data
US 2014/0159660 A1    Jun. 12, 2014

Related U.S. Application Data

(63) Continuation of application No. 13/152,813, filed on Jun. 3, 2011, now Pat. No. 8,624,719.

(51) Int. Cl.
*B60Q 1/00*    (2006.01)
*B60L 11/18*   (2006.01)

(52) U.S. Cl.
CPC ............. *B60L 11/1824* (2013.01); *Y02T 90/16* (2013.01); *Y02T 90/168* (2013.01); *Y02T 90/14* (2013.01); *Y04S 30/12* (2013.01); *B60L 11/1838* (2013.01); *B60L 11/1846* (2013.01); *B60L 2230/40* (2013.01); *Y02T 10/7088* (2013.01); *Y02T 10/7005* (2013.01); *Y02T 90/163* (2013.01); *Y02T 90/169* (2013.01); *Y02T 90/128* (2013.01); *Y04S 30/14* (2013.01)

(58) Field of Classification Search
None
See application file for complete search history.

(56) References Cited

U.S. PATENT DOCUMENTS

| | | | | |
|---|---|---|---|---|
| 8,624,719 | B2 * | 1/2014 | Klose et al. | 340/455 |
| 2010/0017249 | A1 * | 1/2010 | Fincham et al. | 705/8 |

* cited by examiner

*Primary Examiner* — Travis Hunnings
(74) *Attorney, Agent, or Firm* — Baker & Hostetler LLP

(57) ABSTRACT

A system and method for remote control of and notification by an electric vehicle supply equipment (EVSE). The system including a remote device, such as a smart phone, having a software configured to remotely control the EVSE and remotely retrieve and receive information from the EVSE. The smart phone may identify and connect to a communication network, automatically identify the EVSE, connect to the EVSE, and send the EVSE instructions for various functions of the EVSE, including charging, vehicle control, and reporting functions. The EVSE may execute the instructions received and return a confirmation to the remote device. The remote device may present the confirmation to a user.

20 Claims, 10 Drawing Sheets

SMART PHONE CONTROL AND NOTIFICATION FOR AN ELECTRIC VEHICLE CHARGING STATION

CROSS REFERENCE TO RELATED APPLICATIONS

This application claims priority to and is a continuation of U.S. patent application entitled, SMART PHONE CONTROL AND NOTIFICATION FOR AN ELECTRIC VEHICLE CHARGING STATION, filed Jun. 3, 2011, having a Ser. No. 13/152,813, the disclosure of which is hereby incorporated by reference in its entirety.

FIELD OF THE INVENTION

The present invention relates generally to a remote control. More particularly, the present invention relates to a remote control that controls a charging station, such as an electric vehicle charging station, and remote notification to the remote device.

BACKGROUND OF THE INVENTION

Vehicles powered either fully or partially by batteries must at some point recharge their batteries. Particularly in the case of battery electric vehicles, the lack of an alternative power source, like one that a plug-in hybrid electric vehicle would have, causes the batteries to deplete faster and have a more limited range. Plug-in electric hybrids are generally less taxing on the batteries and built-in regenerative systems may suffice to recharge the batteries enough to go longer without having to plug-in the vehicle to recharge it. However, the driver will dictate the need for recharging an electric vehicle through the extent of use, driving conditions, and driving style. High mileage, stop-and-go traffic, and quick accelerations are all things that the driver may subject an electric vehicle to, and all will deplete the batteries faster than under ideal conditions.

Vehicles are commonly parked/stored in areas separate from where a vehicle owner/operator generally spends the majority of his time. A garage, be it an attached or detached home garage, or a shared building garage, are places where the vehicle operator may park and leave his vehicle, and not return to the garage until it is time to operate the vehicle again. Carports, parking lots, street parking spots, driveways, racks, docks, hangars, and others are all examples of where one may leave his vehicle while it is not in use, and otherwise spend little to no time at that location for reasons not relating to the use of the vehicle. Since places where the vehicle may be stored are not usually considered living or working spaces, they are often not as easily accessible as other places where one may conduct his daily activities.

Unlike traditional fossil fuel vehicles, and non-traditional alternative fuel vehicles, which can be adequately fueled, generally by filling a fuel tank with a liquid fuel, in a matter of seconds or a few minutes while the vehicle operator fills the fuel tank, an electric vehicle's charge time is generally measured in hours. Also unlike other forms of refueling, electric vehicles are often recharged while parked or stored in their designated areas, like the areas described above. Thus, because recharging an electric vehicle is a relatively lengthy process that is often carried out in places where the vehicle operator doesn't spend time, it would be useful for the vehicle operator to be able to monitor and control the vehicle charging remotely.

It is desirable to provide a convenient way of controlling and monitoring the recharging of electric vehicles from remote devices, such as smart phones, that can be used in locations away from where the electric vehicles are parked/stored. This will allow vehicle operators to better prepare for and plan electric vehicle usage without requiring that they go to the area where the vehicle and/or electric vehicle supply equipment is located to effect and to get information relating to the recharging. This will also make the electric vehicle more practical, acceptable and provide a convenience to overcome potential obstacles of ownership and use for the vehicle consumer.

SUMMARY OF THE INVENTION

The foregoing needs are met, to a great extent, by the present invention, wherein in one aspect, a method and apparatus are provided such that a smart phone may control and receive notifications from an electric vehicle supply equipment.

In accordance with one embodiment of the present invention, an apparatus for remotely communicating with an electric vehicle supply equipment (EVSE) for charging electric vehicles via a communication network is provided, which can comprise a processor configured to execute instruction modules, a memory configured to store the instruction modules, a communication interface configured to transmit a command to the EVSE and receive a confirmation from the EVSE over the communication network, an input device configured to receive an input or a selection, and a display configured to display the selection or the confirmation, wherein the instruction modules can include a communication protocol selection module configured to identify a communication protocol for the communication network, an EVSE connection module configured to connect the communication interface to the EVSE over the communication network, an instruction transmit module configured to send the command from the communication interface to the EVSE over the communication network, and a confirmation receipt module configured to receive communications to the communication interface from the EVSE over the communication network.

In accordance with another embodiment of the present invention, a method for remotely communicating with an electric vehicle supply equipment (EVSE) for charging electric vehicles via a communication network is provided, which can comprise selecting a communication protocol for the communication network that is connected with the EVSE, via a processor, connecting to the EVSE connected to the communication network, via a communication interface, receiving a signal representing a selection of an option, via an input device, transmitting a command to the EVSE over the communication network, via the communication interface, and receiving a communication from the EVSE acknowledging the command, via the communication interface.

In accordance with still another embodiment of the present invention, a system for remotely communicating with an electric vehicle supply equipment (EVSE) for charging electric vehicles via a communication network is provided, which can comprise a means for processing instruction modules, a means for storing the instruction modules, a means for communicating over the communication network, a means for receiving input or a selection, and a means for displaying the selection or a confirmation, wherein the instructions modules can include a communication protocol selection module configured to identify a communication protocol for the communication network, an EVSE connection module configured to connect the means for communicating to the EVSE over the communication network, an instruction transmit module configured to send a command from the communication interface to the EVSE over the communication network, and a confirmation receipt module configured to receive communications to the means for communicating from the EVSE over the communication network.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
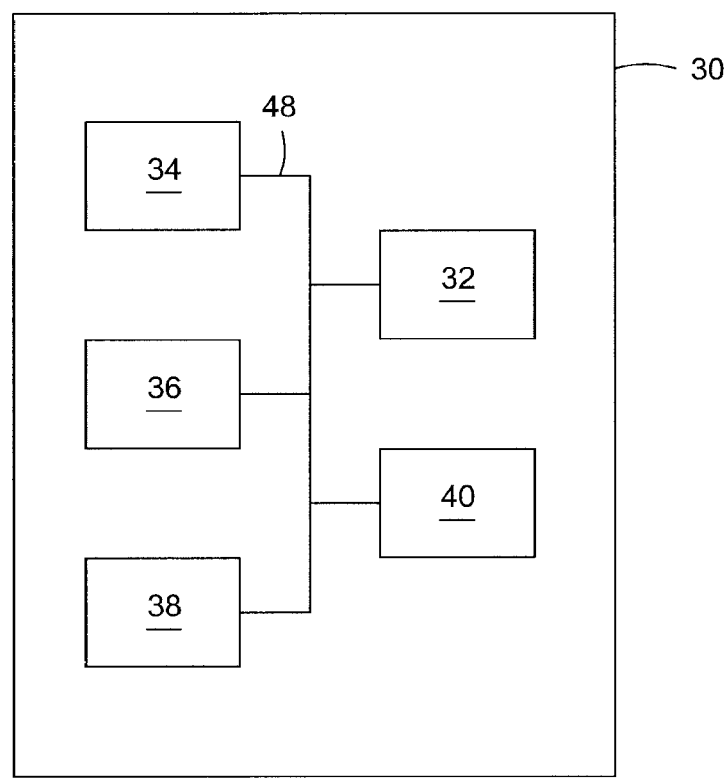
FIG. 1 is a block diagram view of an apparatus for connecting an electric vehicle to Level I or Level II power source according to an embodiment of the invention.

An embodiment of the present inventive system for connecting an electric vehicle, such as a battery electric vehicle (BEV) or a plug-in hybrid electric vehicle (PHEV), to a Level I or II power source (Level II power may also be referred to as high voltage) may include an apparatus, such as an electric vehicle supply equipment (EVSE) for connecting the electric vehicle to a power source. The EVSE may be employed to make a circuit connection to allow power from an electrical socket, like a wall socket, to flow to a charging circuit within the electric vehicle. The wall socket may be a standard outlet found in a residential garage or a socket at a powering station in or outside the residential garage. The power station may be positioned, for example, at a parking garage, at a public parking space, at a rest stop, a conventional gas station, or a powering station (similar to a gas station, but has power stations instead of gas pumps). Further, the EVSE may be constructed to at least meet industry standards, such as SAE J1772, UL 2594, and NEC Article 625. The SAE J2836 vehicle communication standard may also be considered in constructing the EVSE.

The EVSE may have a socket connector at a first end to couple the EVSE to the electrical socket, such as a wall socket, and a vehicle connector at a second end to couple the EVSE to the electric vehicle. Once coupled, to both the wall socket and the vehicle, the EVSE may allow passage of electrical current from the wall socket to the electric vehicle, thus recharging the electric vehicle's batteries. This embodiment allows for the use of standard electrical outlets instead of hardwiring the EVSE directly to a power source.

Level I and Level II sockets are different in configurations. The EVSE may be constructed and/or provided with adapters to make the EVSE compatible with both a Level I and II socket. This may be accomplished through a combination of internal hardware and/or electrical components, external wiring components, and plug components and/or adapters.

In addition, the EVSE may analyze signals and/or data received from the electric vehicle. Analyzing the signals and/or data may involve checking the electric vehicle for specific conditions. While analyzing, the EVSE may determine when to allow and when to prohibit the flow of current between the socket and the electric vehicle.

A user of an EVSE may require that the EVSE be able to charge more than one vehicle. In one embodiment the EVSE may be configured to charge the vehicles simultaneously. Other embodiments may include an EVSE which may charge vehicles sequentially in a number of different manners.

The invention will now be described with reference to the drawing figures, in which like reference numerals refer to like parts throughout.

FIG. 1 is a block diagram view of an apparatus for connecting an electric vehicle to Level I or Level II power source according to an embodiment of the invention. An EVSE 30 is one such apparatus and may include an input device 32, a memory 34, a communication device 36, a processor 38, and a display 40, some or all of which can be interconnected by a data link 48. The EVSE 30 can be a general computing device, such as a personal computer (PC), a UNIX workstation, a server, a mainframe computer, a personal digital assistant (PDA), a cellular phone, a smart phone, some combination of these or any other suitable computing device. Alternatively, the EVSE 30 can be a specialized computing device made up of components specifically chosen to execute the functionality of the EVSE 30. The remaining components can include programming code, such as source code, object code or executable code, stored on a computer-readable medium that can be loaded into the memory 34 and processed by the processor 38 in order to perform the desired functions of the EVSE 30.

The processor 38 may be executed in different ways for different embodiments of the EVSE 30. One embodiment is that the processor 38 is a device that can read and process data such as a program instruction stored in the memory 34 or received from a source on the electric vehicle. Such a processor 38 may be embodied by a microcontroller. On the other hand, the processor 38 may be a collection of electrical circuitry components built to interpret certain electrical signals and perform certain tasks in response to those signals, or an integrated circuit.

The memory 34 may include, for example, any form or combination of volatile, non-volatile, solid state, magnetic, optical, permanent, removable, writable, rewriteable, and read-only memory. The memory 34 may contain a number of program instructions for use with the EVSE 30. The instructions may include methods, for example, for controlling the flow of current between the electrical socket and the electric vehicle. These methods may include controlling when to allow or prohibit the flow of current, or perhaps moderate the flow of current. The flow of current can be controlled based on various factors such as when off peak rates of an electrical utility are in progress; the usage of power, for example, within a house, a building, a power grid, or a parking structure; the availability of current or if the current is constant; scheduled power outages; availability of raw materials that are used in generating electricity; the availability of alternative means of generating electricity; the weather at the local charging station or outlet, which can effect means of generating electricity, such as wind turbines, and solar panels and the like.

Further, the memory may contain software having instructions related to diagnosing vehicle functions, such as OBD-II, battery testing, tire pressure sensor testing, emissions testing and the like. Further, the software may include the ability to track the status of various batteries in the vehicles, such as which batteries have been replaced, the remaining battery life of the various batteries, the warranty information about the batteries, the type of batteries used in the vehicle (mix and match) and the like. Many other embodiments may provide for further methods, some of which will be discussed herein.

Additionally, an embodiment of the EVSE 30 can communicate information to a user through the display 40 and request user input through the input device 32 by way of an interactive, menu-driven, visual display-based user interface, or graphical user interface (GUI). The user may interactively input information using direct manipulation of the GUI. Direct manipulation can include the use of a pointing device, such as a mouse or a stylus, to select from a variety of selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of a mouse or buttons or keys, including for example, a trackball, a scroll wheel, a touch screen or a voice-activated system.

Some options that may be selected through the input device 32 may allow the user control over the charging of the electric vehicle. The user may select, for example, that the batteries be charged to or at a certain level or for a certain amount of time, a certain number of charges or start and stop at a certain time or at a particular event. Further, the user may select to be notified on a separate device, like on a cellular device, smart phone, pager, fax, remote control/display, or other wired and wireless devices, that the electric vehicle or charging is in a certain state, such as complete or faulted. The user may be able to set the EVSE 30 to control and power some of the vehicle's components while plugged in. For example, during different seasons the user may desire to heat or cool the vehicle as he gets ready for work in the morning so that the vehicle is comfortable when he gets in it. The EVSE 30 may also control setting the radio, power seats and mirrors depending on user preferences. Through the use of the EVSE 30, other devices like a GPS, radar detector, and other devices that require boot or warm up periods may be powered on before the user enters the electric vehicle.

The display 40 may have a more simple implementation than previously mentioned, consisting of one or multiple indicators. Such indicators may consist of a small liquid crystal display (LCD) that can depict text or graphics. The LCD may be monochrome or colored. Other embodiments may include a single or multiple light emitting diodes (LED). This implementation could work for transmitting a limited number of simple messages. An LED may emit a single color of light, or it may be able to emit a number of different colors. Each LED or color may be associated with a different message. Some messages may include that power is available to charge the electric vehicle batteries, that charging the electric vehicle batteries is in progress, that the charging is complete, and that there is a fault or problem. The display may also be used to indicate the level of charge for the batteries, the number of times the batteries have been charged and the remaining charging time or the time the batteries have been charging.

The display 40 may also be separate from the EVSE 30 or a second remote display can be utilized. The second remote display (not shown) can be a remote control panel that receives the same or similar information as the display 40. The second remote display can also control the EVSE 30 in the same or similar manner as the display 40 or the input device 32.

Figure 2A:
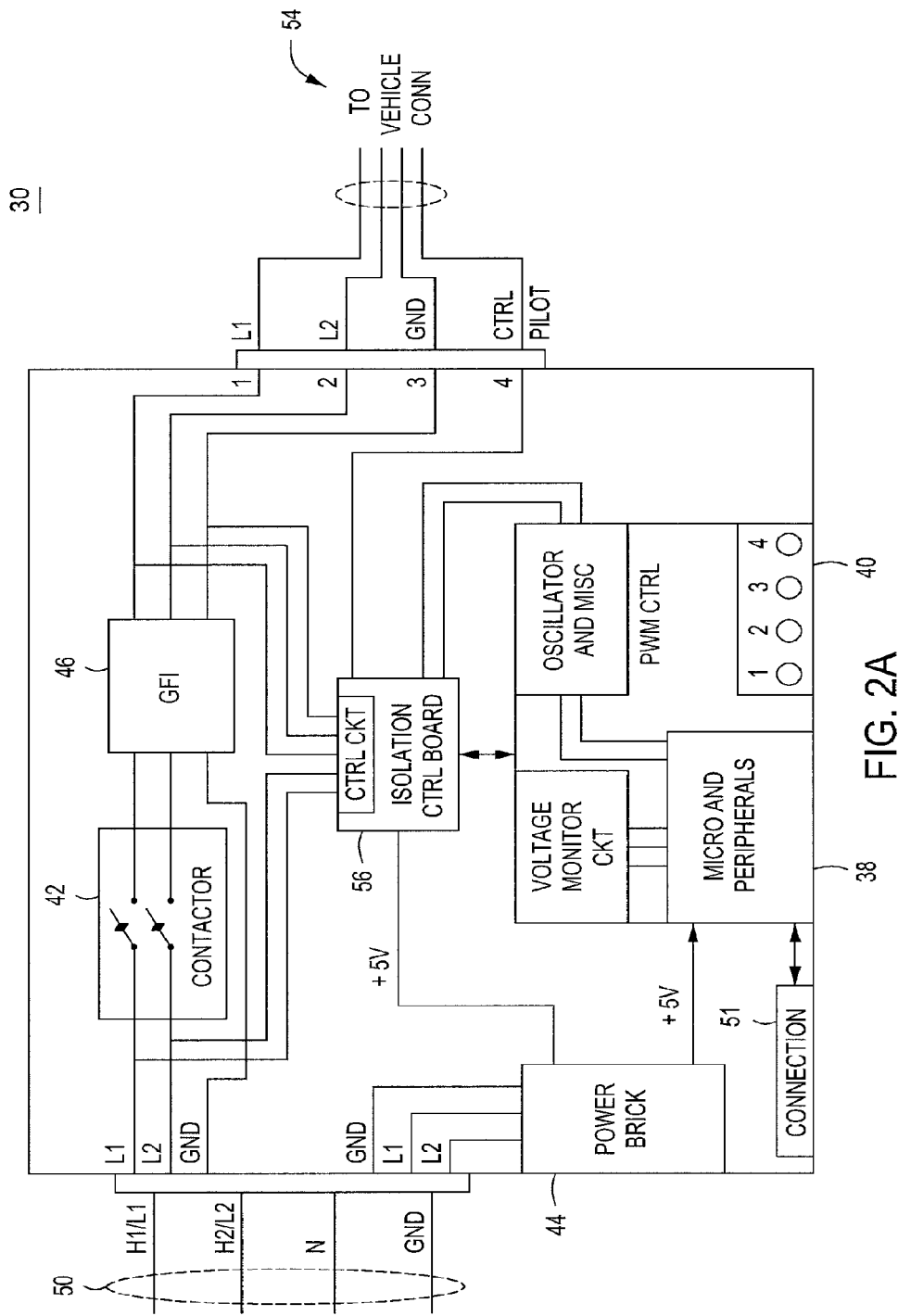
FIG. 2A is a schematic view of an apparatus for connecting an electric vehicle to a high voltage power source according to another embodiment of the invention.
Figure 2B:
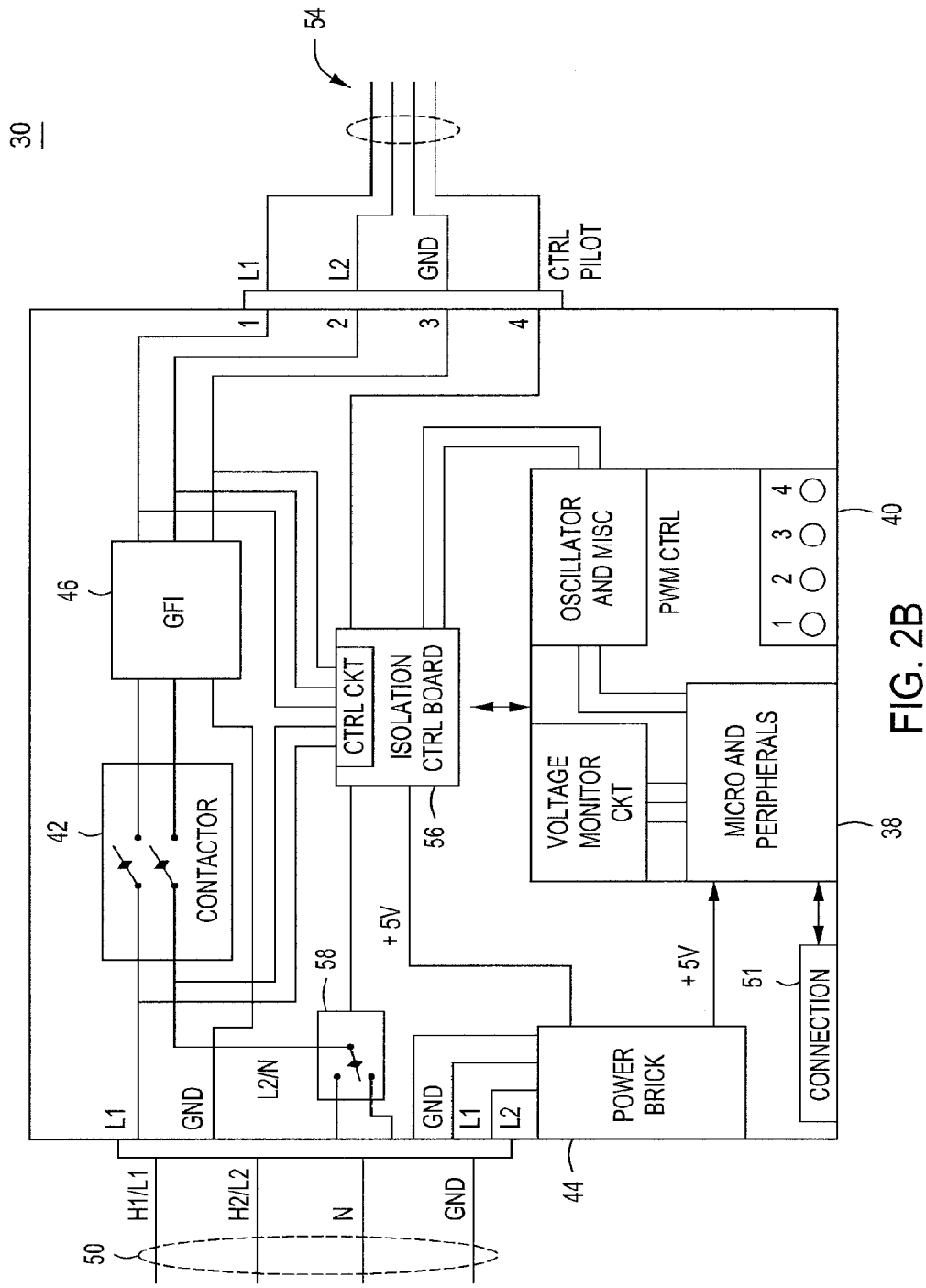
FIG. 2B is a schematic view of an apparatus for connecting an electric vehicle to a Level I or Level II power source according to another embodiment of the invention.

FIG. 2A is a schematic view of an apparatus for connecting an electric vehicle to a high voltage power source according to another embodiment of the invention. FIG. 2B is a schematic view of an apparatus for connecting an electric vehicle to a Level I or Level II power source according to still another embodiment of the invention. The EVSE 30 may further include a relay 42 (referred to in FIGS. 2A and B as a contactor), a voltage regulating device 44 (referred to in FIGS. 2A and B as a power brick), a breaking device 46 (referred to in FIGS. 2A and B as a GFI), and a switch 58 (not shown in FIG. 2A), some or all of which may be connected by an electric conduit 50. A control circuit 56 may act as a buffer between different parts of the EVSE 30. At one end of the EVSE 30 is a socket connector 52 (FIG. 3) and at the other end is a vehicle connector 54 (also shown in FIG. 3 and explained herein).

The voltage regulating device 44 may be needed to power the electronic components of the EVSE 30. Since the EVSE 30 may draw its power from the same electrical socket it uses to charge the batteries of the electric vehicle, the EVSE 30 will be receiving high voltage electricity. The electrical socket may supply, for example 120 volts, 220 volts or 240 volts. The high voltage of the power drawn from the electrical socket could damage some of the electronic components of the EVSE 30. Thus, the voltage regulator device 44, such as a transformer or a voltage regulator, may be employed between to the electrical socket and the electrical components of the EVSE 30. The voltage may then be lowered to a level that is manageable to the electrical components, such as, for example, 5 volts or 12 volts. In other embodiments, the voltage regulator device 44 can increase the voltage as needed by the EVSE 30.

While the voltage regulating device 44 may regulate the voltage to parts of the EVSE 30, there are parts where electricity may flow unaltered from the electrical socket to the electric vehicle. An electric conduit 50 may run the length of the EVSE 30.

In one embodiment of the invention, the electric conduit 50 may be of the type having a gauge and/or rating such that it may appropriately handle the range of supplied current from the electrical socket. That being, the electric conduit 50 should be able to handle at least the highest supplied current, and in turn it will also be able to handle lower levels of current. The electric conduit 50 may be one appropriate for handling Level I and Level II charging or any level of charging. The electric conduit 50 suited for Level II charging may be comprised of a combination of conduits including, for example, two conduits for power supply (L1 and L2), one conduit as a neutral, and one conduit as a ground. The supplied current may be split over L1 and L2, thus aiding in supplying the proper current for Level I and Level II charging.

In connecting the electric conduit to the internal components of the EVSE 30, it may be convenient to connect some or all of the combination of conduits that make up the electric conduit 50 to the different internal components. For example, the voltage regulating device 44, as discussed herein, receives power from the supplied power from the electrical socket the EVSE 30 connects to. To receive this power, the voltage regulating device 44 may be connected to, at least, L1 and/or L2.

In one embodiment, the electric conduit 50 includes a relay 42 that may be placed to bridge segments of the electric conduit 50, allowing the EVSE 30 to start and stop the flow of current to the electric vehicle. The electric conduit 50 may optionally be connected to a voltage regulator to step up or step down the voltage passed to the electric vehicle. Further, to aid in providing the proper current to charge the electric vehicle, it is possible to provide the relay 42 with some or all of the current provided by the electrical socket. Power supply conduits L1 and L2 may both be connected to the relay 42. Alternatively, the relay 42 may be connected to only either conduit L1 or L2.

In an alternative embodiment, it may be that when only connected to conduit L1 or L2, the relay 42 may only enable the EVSE 30 to be able to provide the vehicle with Level I charging capabilities. Thus, to enable the EVSE 30 to provide Level II charging capabilities, as well as Level I charging, it maybe a possible to provide a switch 58 that will allow the EVSE 30 to selectively connect the unconnected conduit, either L1 or L2, to the relay 42. In one embodiment, the switch 58 may be connected to, at least, the conduit, either L1 or L2, not already connected to the relay 42. Further, the switch 58 may be connected to the control circuit 56 that controls when the switch allows for the selective connection of the unconnected conduit, either L1 or L2, to the relay 42. The control function will be discussed herein.

Also connected to the electric conduit 50 may be a breaking device 46 (also called a ground device, GFI, or a current monitor). The breaking device 46 is intended to cut power along the electric conduit 50 quickly so as to avoid harming a user with a high voltage electric shock, harming the components of the EVSE 30 or damaging the electric vehicle. Such a breaking device 46 may be a ground fault interrupter. If the breaking device 46 trips and cuts power, EVSE 30 may have an auto-reset function to attempt to restore the power transfer to the electric vehicle. The auto-reset function may attempt to restore the power transfer after a determined time and/or for a determined number of tries. The auto-reset functions allows for continuous charging of the vehicle should a power surge occurs while the user is asleep or away from the charging location.

The control circuit 56 may be connected to the electric conduit 50 and to the data link 48. Acting as a buffer between two portions of the EVSE 30, the control circuit may pass signals from the electric conduit 50 representing the voltage on the electric conduit 50 to the processor 38. From these signals, the processor 38 may react accordingly to control the relay 42 and the breaking device 46. Further, the processor 38, and other components, such as a voltage monitor, an oscillator, and a pulse width modulator may act accordingly to conduct a number of functions of the EVSE 30. The control circuit 56 may also be connected to the voltage control device 44 for power, and a control pilot pin of a vehicle connector (discussed herein) to pass on signals from the vehicle to the other components of the EVSE 30.

In the switch's 58 initial state, it will be open, thereby causing a disconnect between the unconnected conduit, either L1 or L2, and the relay 42. When the EVSE 30 is connected to a Level I electrical socket, the control circuit 56 would recognize that there exists a 120 volt drop between the powered conduit, either L1 or L2, and the neutral conduit of the electric conduit 50 and leave the circuit between the unconnected conduit, either L1 or L2, and the relay 42 open. Alternatively, when the EVSE 30 is plugged into a Level II electrical socket, then the control circuit 56 would recognize the power on the unconnected conduit and, either via a signal from the processor 38 or via logical circuitry, provide a signal to the switch 58 to close the circuit between the unconnected conduit and the relay 42. With the circuit closed, the relay 42 is connected to both power supply conduits, L1 and L2, of the electric conduit 50, and the EVSE 30 can provide the electric vehicle with Level II charging capabilities.

The EVSE 30 also includes peripheral connection 51 that can add additional functionality to it, including USB, FireWire, card reader, vehicle connector interface (for OBD-II, and the like connections), CD, DVD, memory, wireless communication, and additional hardware and software. The EVSE's software can be updated via the peripheral connection 51. Additional hardware can be added to include, for example, additional processor, memory, FPGA (field programmable gate array), ASIC, pin connections, multiplexor and the other hardware to expand the functionality of the EVSE 30.

Figure 3:
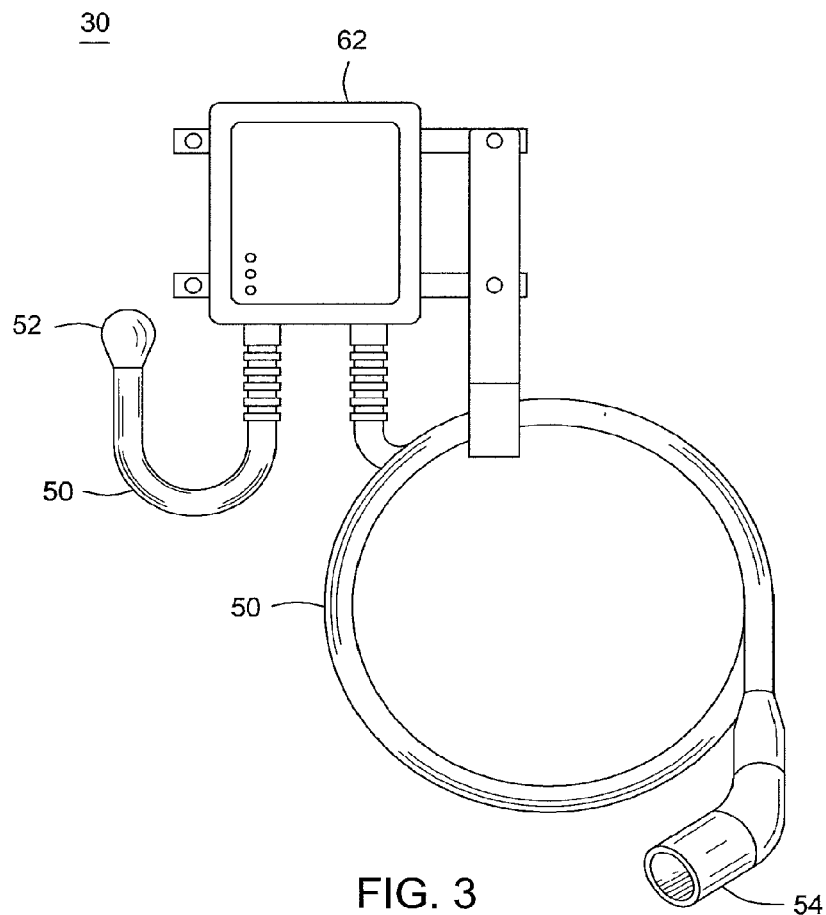
FIG. 3 is an elevation view of an apparatus for connecting an electric vehicle to a Level I or Level II power source according to another embodiment of the invention.

FIG. 3 is an elevation view of an apparatus for connecting an electric vehicle to a Level I or Level II power source according to another embodiment of the invention. Attached to a respective end of the electric conduit 50 may be the socket connector 52 and the vehicle connector 54. The socket connector 52 may couple with the electrical socket to allow electricity to flow to the EVSE 30. Any of a number of available or proprietary connectors may be used for the socket connector 52. Such available connectors may include a NEMA 5 plug, for example, a NEMA 5-15 plug for Level I charging, or a NEMA 14 plug, for example, a NEMA 14-50P plug for Level II charging, if appropriate for the electrical socket. These socket connectors 52 may be interchangeable. Alternatively, the socket connector may be of an appropriate type for Level I or Level II charging, and an adapter 60 may be used to adapt the socket connector 52 to work for the other type of charging, as discussed herein. Connected to the opposite end of the electric conduit 50 may be the vehicle connector 54, which also may be any number of available or proprietary connectors. One such example of a vehicle connector 54 may be a five-pin connector including two power pins, a ground pin, a control pilot pin, and a proximity sensor pin as specified in the SAE standard J1772 and designed by Yazaki of North America.

The EVSE 30 may include a housing 62. The housing 62 may encase a number of the components of the EVSE 30, for example, all the components previously mentioned except for portions of the electric conduit 50, the socket connector 52 and the vehicle connector 54. A bracket may be attached to the housing 62 to mount the housing 62 on a vertical surface such as a wall or post. The housing 62 or bracket may further include a hook to hang the power conduit 50. Alternatively, the power conduit may be retractable into the housing 62.

The EVSE 30 may be available for both indoor and outdoor applications. Proper weather proofing may be part of the housing to protect the components from damage and the users from injury. Some outdoor installations of the EVSE 30 may include burial in the ground, being attached to a post, or integrated into a pedestal.

Figure 4:
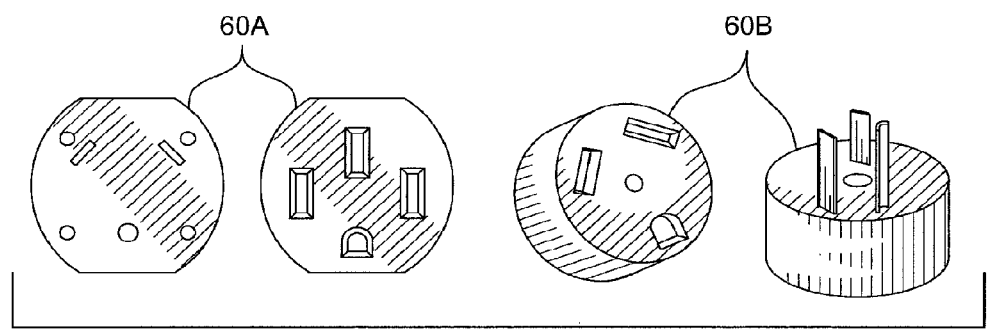
FIG. 4 illustrates adapters for connecting an apparatus that connects to a Level I or Level II power source according to another embodiment of the invention.

FIG. 4 illustrates adapters 60A and 60B for connecting an apparatus that connects to a Level I or Level II power source according to another embodiment of the invention. If the socket connector 52 is, for example, a NEMA type 5 plug suitable for Level I charging is at the end of the electric conduit 50, and it is desired to plug the EVSE 30 into a Level II socket, then the adapter 60A is configured to accept the prongs of the socket connector 52 (with NEMA type 5 plug) and has prongs configured to be inserted into a Level II socket. Alternatively, if the socket connector 52 is, for example, a NEMA type 14 plug suitable for Level II charging is at the end of the electric conduit 50, and it is desired to plug the EVSE 30 into a Level I socket, then the adapter 60B is configured to accept the prongs of the socket connector 52 (with NEMA type 14 plug) and has prongs configured to be inserted into a Level I socket. An example of an adapter 60B that would allow for connecting the socket connector 52 configured to connect to a Level II socket to connect to a Level I socket is the Marinco 50 A to 15 A RV Pigtail Adapter 150SPPRV.

Referring back to FIG. 1, in various embodiments, the EVSE 30 can be coupled to a communication network. The communication network allows for communication between the EVSE 30 and a remote device, such as a smart phone. The EVSE 30 can be coupled to the communication network by way of the communication device 36 which in various embodiments can incorporate any combination of devices—as well as any associated software or firmware—configured to couple processor-based systems. Such communication devices 36 may include modems, network interface cards, serial buses, parallel buses, LAN or WAN interfaces, wired, wireless or optical interfaces, and the like, along with any associated transmission protocols, as may be desired or required by the design.

The communication network links the communication device 36 of the EVSE 30 with the smart phone (as discussed herein). Various embodiments of the communication network may include any viable combination of devices and systems capable of linking computer-based systems that may use various communication protocols, such as USB; Bluetooth; WiFi; ZigBee; power line communication (PLC); home area network (HAN); Silver Spring network; stable election protocol (SEP); the Internet; TCP/IP; an intranet or extranet; a local area network (LAN); a wide area network (WAN); a direct cable connection; a private network; a public network; an Ethernet-based system; a token ring; a value-added network; a telephony-based system, including, for example, T1 or E1 devices; a cellular telephony system, for example, GPRS or GSM; a satellite system; an Asynchronous Transfer Mode (ATM) network; a wired system; a wireless system; an optical system; a combination of any number of distributed processing networks or systems or the like.

The remote device may be a common remote device, such as a electronic control unit of a vehicle, an example of which often used in vehicles for receiving diagnostic signals such an OBD-II signals. The remote device may also be a proprietary remote device, such as one developed for use with a specific brand of engine or specific model of engine. Further embodiments may encompass the remote device being a data receiver for a tire pressure management system. In either of these cases, the communication device 36 may be able to connect with a dealer, manufacturer, service department, government entity such as a state inspection office, etc. and report the findings transmitted from the remote device.

Moreover, the remote device may be a wireless device with a display that gives the user information about the status of the electric vehicle connected to the EVSE 30. The remote device may be such that it is easily placed within a room in a building, or even attached to a key like a key chain. The information delivered to the user may include charge status of the vehicle, diagnostic messages, tire pressure management system messages, and other vehicle related information.

The EVSE 30 may also act as a remote control allowing the user to control function of the car, like power, air conditioning and heat, radio settings, power seat and mirror settings, etc. The EVSE 30 may also have internet access or similar communication access to remote server in order to obtain information such as emails, weather report, web pages, stock information, diagnostic databases and the other information.

The communication device 36 may also be able to communicate with the local utility company. This may allow for the utility company to know that the vehicle is connected and to charge the vehicle at a certain time of the day, such as during off-peak hours, if requested by the user. One embodiment to implement this feature is through the remote device, where the remote device encompasses a smart meter or a computerized utility meter. The EVSE 30 may communicate with the smart meter to determine when the EVSE 30 should charge the vehicle depending on certain parameters. If it is a goal to reduce energy costs, the smart meter may determine at what time of the day the rate for electricity is lowest, and during that time, tell the EVSE 30 to charge the vehicle. The EVSE 30 may also communicate with the smart meter to indicate when the vehicle is charging and how much charging is required. With this information, the smart meter may be able to manage the power consumption of the rest of a house to keep overall power consumption at or herein a desired level.

A further embodiment of the EVSE 30 may be to include a battery charging monitor. This feature could add a further layer of safety to the EVSE 30 by preventing overheating of the charging battery by, for example, decreasing the amount of electricity to the vehicle or simply terminate the electrical supply to the vehicle. The EVSE 30 may be able to connect to the vehicle's own battery temperature sensor, such as a thermistor or a laser temperature sensor. Signals from the temperature sensors may be interpreted by the EVSE 30. If the signals indicate that the temperature of the battery is rising to an undesired temperature, the EVSE 30 may discontinue charging the battery, and in some instances issue a notification of the problem to the user. The notification may be sent to a smart phone.

Other embodiments of the EVSE 30 may allow for the power conduit 50 to have multiple vehicle connectors 54 stemming therefrom, or multiple power conduits 50, each with its own vehicle connector 54 or a combination thereof. The EVSE 30 may charge the vehicles simultaneously or switch from one vehicle to another after the first vehicle has completed recharging. There may also be an adapter that allows the socket connector to connect to low voltage sockets, such as ones that provide 120 volts or less, as discussed herein. In other embodiments, the EVSE 30 can connect to alternative power sources that use renewable energy to charge the vehicle. Such sources may include solar panels and wind turbines, for example. If the alternative power sources alone are insufficient, then they may be supplemented by an electrical socket connected to a utility company source.

In an embodiment where the EVSE 30 is configured to charge more than one vehicle simultaneously, as mentioned herein, the EVSE 30 may have multiple power conduits 50, each with its own vehicle connector 54. An EVSE 30 connected to a power source, such as an electrical socket, may divide the power provided by the source and provide a certain percentage of the power to each vehicle via the respective power conduit 50 and vehicle connector 54 connected to each vehicle. In the simplest implementation of such an embodiment, the power could be split 50/50, with half of the power provided to each vehicle for charging.

Not all simultaneous charging need be so symmetric. An EVSE 30 configured for simultaneous charging may include power management features that allow the EVSE 30 to increase or decrease the power provided to the individual vehicles depending on various factors. For example, a situation may exist where a first vehicle is connected to the EVSE 30 before a second vehicle. While the first vehicle is charging alone, it may be allocated all of the power available for charging, i.e. 100% power. Once the second vehicle is connected to the EVSE 30, some of the 100% power allocated to the first vehicle may be reallocated to the second vehicle, making the power split, for example, 50/50, 70/30, 45/55, or any other combination.

The amount of power allocated to each vehicle may vary for multiple reasons. One may be the charge state of the battery in the respective vehicle. The EVSE 30 may be able to tell the level of charge remaining in the battery of each vehicle. If one vehicle battery has a higher charged level than the other, then the EVSE 30 may determine to provide the vehicle battery with the lower charged level more power. This determination may be made on the basis that the battery with the lower charge may require more power to charge it faster, while the battery with more remaining charge could finish charging in an adequate time with less power. The reverse of this power distribution may occur in the same situation depending on the power management settings. The EVSE 30 may determine that it may be more efficient, to provide the vehicle battery with a higher charged level with more power than the other battery to more quickly complete the higher charged battery's charging. Then, once the higher charge battery is done charging, or at a certain level, the EVSE 30 may allocate more power to the lower charged battery to complete charging.

During simultaneous charging, the charge levels of the batteries change. The EVSE 30 may have the ability to detect these charge levels and manage the power provided to each battery throughout the charging. For example, when a battery is charging, there may come a point in the charging cycle where the battery is approaching a full charge. Often at this point, charging power to the battery is reduced to until the battery is fully charged. In many instances, the reduction of charging power may occur in stages, each stage further reducing the charging power. If one battery were to reach this point before another charging battery, then the power management system could reallocated the power no longer needed for one battery to the other.

Further, the EVSE 30 does not have to deliver 100% of the charging power to any of the batteries, alone or combined, during charging. There may be times, when none of batteries require enough charging power to equate to 100% of the available charging power. In such instances, the EVSE 30 may be able to control the amount of power delivered to the batteries such that the delivered power totals less than the available charging power, for example, 15/20 or any other combination less than 100%.

Another factor that may affect how the EVSE 30 allocates the charging power to the vehicles may have to do with the battery technology implemented within the vehicles themselves. The EVSE 30 may be able to identify the battery technology used in a specific vehicle and determine that the vehicle charging is best effected using a specific charging profile, or the vehicle may be able to instruct the EVSE 30 to use a specific charging profile based on the battery technology, charge state, weather conditions, availability of accessible charging and/or gas stations within a given driving range, or other factors. Any information used to identify the battery technology, the vehicle, the battery charge state, or any other feature of the vehicle and/or battery may be detected or received by the EVSE 30 via the communication device 36 over the communication network. The EVSE 30 may connect to the vehicle wirelessly or by wire, for example via OBD II connector or the vehicle connector 54.

The allocation of electricity, detection of battery level, and the type of battery system that is in the vehicle and other detection discussed herein can be done automatically when the EVSE is connected to the vehicle. Alternatively, the allocation and detection can be predetermined and manually set by the user.

As stated above, the allocation of charging power may also be determined by customizable settings. One such setting, which may be user programmable to the EVSE 30 via the input device 32 or the remote device, is a vehicle priority setting. The EVSE 30 may be instructed that one vehicle has priority over another, thus the prioritized vehicle should complete charging before the other vehicle. For example, one user may go to work earlier than another user or one user anticipate only a lower usage of the vehicle on a particular day but may need more charging on another day. Other settings may indicate, for example, when the next time the vehicle will be used, how far the vehicle will be driven, the conditions the vehicle will be driven in (hills or no hills, mainly during high traffic times or not, for example), how economical the user wishes the EVSE 30 to be when charging the vehicle, a minimum charge level the user wishes the car to be at, the current or forecasted weather, the availability of accessible charging and/or gas stations within a given driving range, or any other factors that may affect how the EVSE 30 may allocate the charging power to meet the charge level needed, indicated by the settings, for the next use of the vehicle.

Sequentially charging multiple vehicles is another option for an EVSE 30 charging more than one vehicle. The simplest approach would be to configure the EVSE 30 to charge the vehicle it is connected to first until completion and then charge another vehicle thereafter. This could be implemented in a semi-manual fashion where the EVSE 30 has one power conduit 50 and one vehicle connector 54, and the EVSE 30 signals a user when one vehicle is charged and the EVSE 30 is available to be connected to another vehicle for charging.

Another option would be to configure the EVSE 30 with multiple power conduits 50 having respective vehicle connectors 54. In one embodiment, there can be one power conduit 50 having multiple vehicle connectors 54 stemming therefrom.

With multiple vehicle connectors connected to respective vehicles, the EVSE 30 could be configured to automatically sequentially charge the vehicles. One implementation, similar to the sequential charging described herein, would be when completing the charging of a connected vehicle, the EVSE 30 could automatically charge another vehicle when finished charging the first one.

Sequential charging could be implemented in a number of other ways as well. Some embodiments of sequential charging would not require that the first vehicle charging be fully charged prior to reallocating power from the first vehicle to the second vehicle. Some batteries can be quickly charged with high power at first, thereby charging a certain percentage of the battery's charge potential. Often that portion of the battery's charge potential that can be quickly charged is a majority of the charge potential or a predetermined charge level. The remaining charge potential of the battery may require slower charging at a lower power level, including a trickle level. In instances where the vehicles being charged possess these types of batteries, the EVSE 30 may charge a substantial portion of the battery of the first vehicle until a quick charge potential threshold has been reached. Once the quick charge threshold of the first vehicle is reached, the EVSE 30 may discontinue power to the first vehicle (or charge at a lower level) and reallocate the power (or most of the power) to the second vehicle. When the EVSE 30 determines that the second vehicle has reached a satisfactory charge level, the EVSE 30 may discontinue power to the second vehicle and reallocate the power, at an appropriate level, to the first vehicle. This process of switching the allocation of power between the first and second vehicle may occur numerous times depending on power management settings implemented in the EVSE 30, based on efficiency, speed, economy, weather, availability of charging and/or gas station, or other factors.

The switching of power allocation between charging vehicles during sequential charging may occur for various reasons. One such reason is the EVSE 30 can be configured to detect the remaining charge levels of the connected vehicles. If the first vehicle is already connected and charging when the second vehicle is connected, the EVSE 30 may be able to compare the remaining charge level of each vehicle. In one instance, the EVSE 30 may determine that the first vehicle's remaining charge level is lower than the second vehicle. Then, depending on power management settings, the EVSE 30 may determine to continue charging the first vehicle until it reaches a satisfactory charge level, which may include a completed charge or a partial charge, before reallocating some or all power to the second vehicle. Conversely, the EVSE 30 may determine to discontinue charging the first vehicle and reallocate power to the second vehicle until a satisfactory charge level is reached before continuing to charge the first vehicle. This may be due to the need of the second vehicle earlier then the need of the first vehicle. The same charging determinations can be made by the EVSE 30 when the second vehicle's remaining charge level is lower than the first vehicle.

The satisfactory charge levels mentioned herein may be at any level of charging. A vehicle's battery may reach multiple satisfactory charge levels throughout the sequential charging process causing the EVSE 30 to discontinue charging one vehicle and allocate the charging power to another vehicle several times. The satisfactory charge level for each vehicle battery may depend on a single factor or multiple factors. Some such factors may include: battery charge state, battery type, charging method, charging efficiency, charging cost, charging speed, weather, availability of charging and/or gas stations en route, user settings (described herein), or a number of other factors. Similar factors may also be used for the EVSE 30 to determine the level of power to provide when charging a battery.

As described herein the allocation of charging power may also be determined by customizable settings. One such setting, which may be user programmable to the EVSE 30 via the input device 32 or the remote device, is the vehicle priority setting. The EVSE 30 may be instructed that one vehicle has priority over another, thus the prioritized vehicle should complete charging before the other vehicle. Other settings may indicate, for example, when the next time the vehicle will be used, how far the vehicle will be driven, the conditions the vehicle will be driven in, how economical the user wishes the EVSE 30 to be when charging the vehicle, the minimum charge level the user wishes the vehicle to be at, the availability of charging and/or gas stations in the proximity of a path of travel, or any other factor that may affect how the EVSE 30 may allocate the charging power to meet the charge level needed, indicated by the settings, for the next use of the vehicle.

Many of the EVSE's capabilities described in connection with the simultaneous charging description are similarly applicable to sequential charging. In both embodiments the EVSE 30 may be able to detect or receive the same information from the vehicles, and make the same determinations about the vehicles and power management. However, instead of adjusting power levels to multiple vehicles at the same time as in the simultaneous charging, in sequential charging the EVSE 30 adjusts power levels to the charging vehicle and determines when to discontinue charging the charging vehicle and begin charging the other vehicle.

Another embodiment may include the EVSE 30 in communication with a remote server. The remote server may provide instructions to the EVSE 30 or it may just store information, such as in a database, and provide the EVSE 30 with requested information including performing other functions such as sending emails, as requested by the EVSE. In the embodiment where the remote server provides the EVSE 30 instructions, the EVSE 30 may pass information received, extracted, or sensed from the charging vehicle to the remote server. The remote server may then interpret that information and make the charging determinations described herein, such as if a vehicle battery has reached a satisfactory charge level, detect the remaining charge level, and determine when to discontinue charging and reallocate power. The remote sever may also store and take into account the power management settings and user settings. After interpreting the information, the remote server may then instruct the EVSE 30 to implement the different functions described herein.

In the embodiment where the EVSE 30 is connected to a remote server storing a database for providing information requested, the EVSE 30 may have the hardware and software to interpret the information and make the determinations described herein. An example of this would be when the EVSE 30 is connected to the vehicle for charging and basic information is available about the vehicle's make and model, or about the type of battery employed in the vehicle. The EVSE 30 may query the database on the remote server for more detailed information about the vehicle's battery, such as preferred battery charging methods and battery charging thresholds. The database may also be queried for power management settings and user preferences. The EVSE 30 may then use the information queried to make the vehicle charging related determinations.

The remote server may also serve to update software and information stored on the EVSE 30. In the embodiments where the EVSE 30 contains the charging determination software and/or the information used by the charging determination software, such as vehicle information, power management settings, weather, traffic, charging and/or gas station locations, and user preferences, the remote server may update the software and information stored on the EVSE 30.

Figure 5:
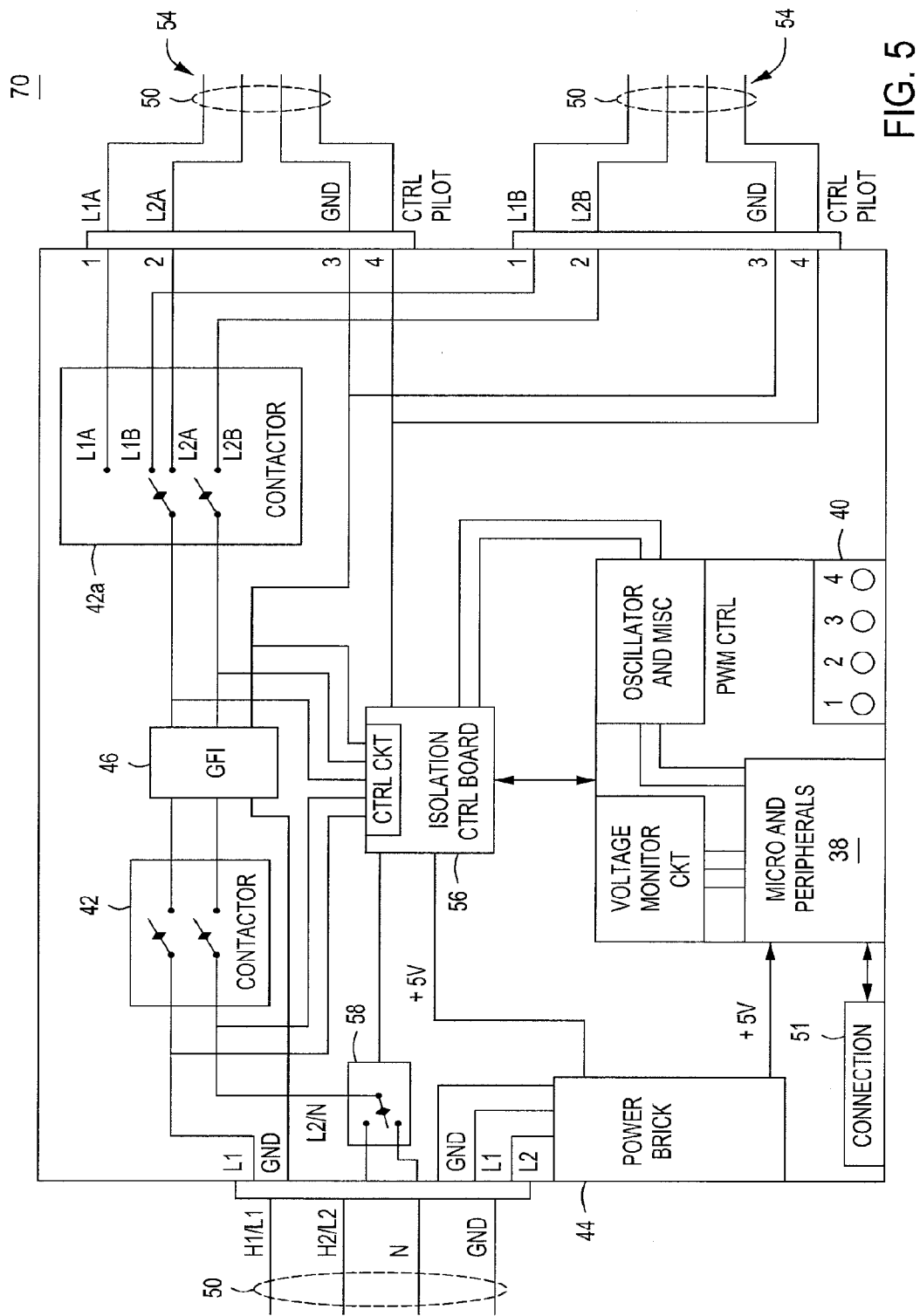
FIG. 5 illustrates schematic view of an apparatus for sequential charging of multiple electric vehicles according to another embodiment of the invention.

Referring now to FIG. 5, illustrated is a schematic of an apparatus for sequentially charging multiple electric vehicles. The apparatus depicted, herein the sequential EVSE 70 is much like the EVSE 30 described herein with a few modifications. The sequential EVSE 70 may include multiple vehicle connectors 54, connected to the rest of the sequential EVSE 70 by a respective power conduit 50. There may also be another contactor 42*a* between the breaking device 46 and the vehicle connectors 54 for controlling the power to each vehicle connector 54. Further, the EVSE 70 may include another voltage regulator device (not shown) to a manipulate the voltage levels provided to the vehicle connector 54.

Figure 6:
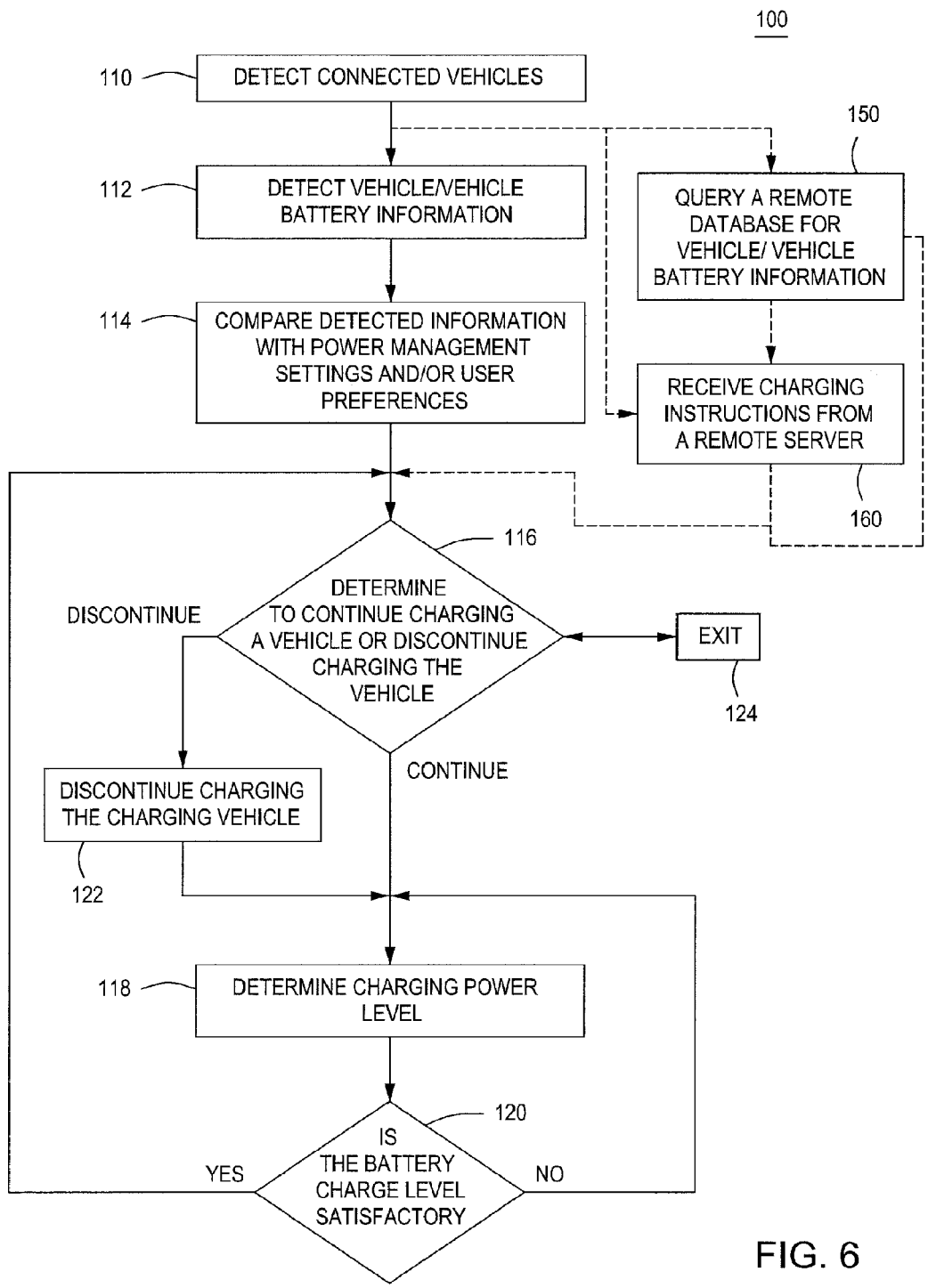
FIG. 6 illustrates a method for sequential charging of multiple electric vehicles according to another embodiment of the invention.

Referring now to FIG. 6, illustrated is a flow diagram of a method for sequentially (or simultaneously) charging multiple electric vehicles 100 according to an embodiment of the invention. First, the EVSE 30 may detect that multiple vehicles are connected to it via the vehicle connectors 54 (step 110). Detecting that multiple vehicles are connected may be conducted by polling the vehicle connectors 54 to see if they are connected to a vehicle, or the EVSE 30 may wait to receive a signal once the vehicle connectors 54 are connected to the vehicles. The signal may be automated or as a result of an entry by the user. Once the EVSE 30 detects multiple vehicles, the EVSE 30 may detect vehicle/vehicle battery information (step 112). Optionally the EVSE 30 may query the remote database for information, such as about the vehicle battery, power management settings, and/or user settings (step 150). In another embodiment, an option may be for the EVSE 30 to pass information to a remote server to process the information and instruct the EVSE 30 on how to manage the charging of the vehicles (step 160). This may be due to the user remotely entering charging information on the remote server for the EVSE to access at a later point in time. The user would access the remote server and enter the desired information for the EVSE to use during charging.

After step 112, the EVSE 30 may then compare any information detected from the first vehicle/vehicle battery with information from the second vehicle/vehicle battery, power management settings, and/or user settings (step 114). After making such comparisons, the EVSE 30 may determine, whether to continue any charging in progress, discontinue charging in progress and begin charging a different vehicle, simultaneously charge the vehicles, or exit (step 116). If the EVSE continues to charge, then the EVSE 30 determines the amount of power to allocate to charging (step 118) one vehicle versus the other, i.e. charging only on vehicle at a certain level or charging both vehicles at respective levels. While charging, the EVSE 30 monitors the charge level of the charging vehicle battery for the charge level (step 120). If the charge level is satisfactory, the process returns back to step 114, otherwise the charging continues.

Back at step 116, if the EVSE 30 determines to discontinue the charging in progress and begin charging a different vehicle, then the EVSE discontinues power to the charging vehicle (step 122). The EVSE 30 then determines the amount of power to allocate to charging the charging vehicle (step 118). While charging, the EVSE 30 monitors the charge level of the charging vehicle battery for the charge level (step 120). If the charge level is satisfactory, the process returns back to step 116, otherwise the charging continues.

If, at step 116, the EVSE 30 determines that all connected vehicles have completed charging, then the EVSE 30 exits the sequential method for sequentially charging multiple electric vehicles 100 (step 124).

As stated herein, the EVSE may potentially perform a variety of other functions in addition to its primary purpose of charging the electric vehicle. Multiple embodiments may also include any number of functions that may be considered secondary purposes of the EVSE. A few examples of these functions may include conducting battery tests and reporting the state of the batteries and the number of times the batteries have been charged. The EVSE may also conduct vehicle diagnostics, execute a tire pressure management system, run an emissions analysis, etc.

Figure 7:
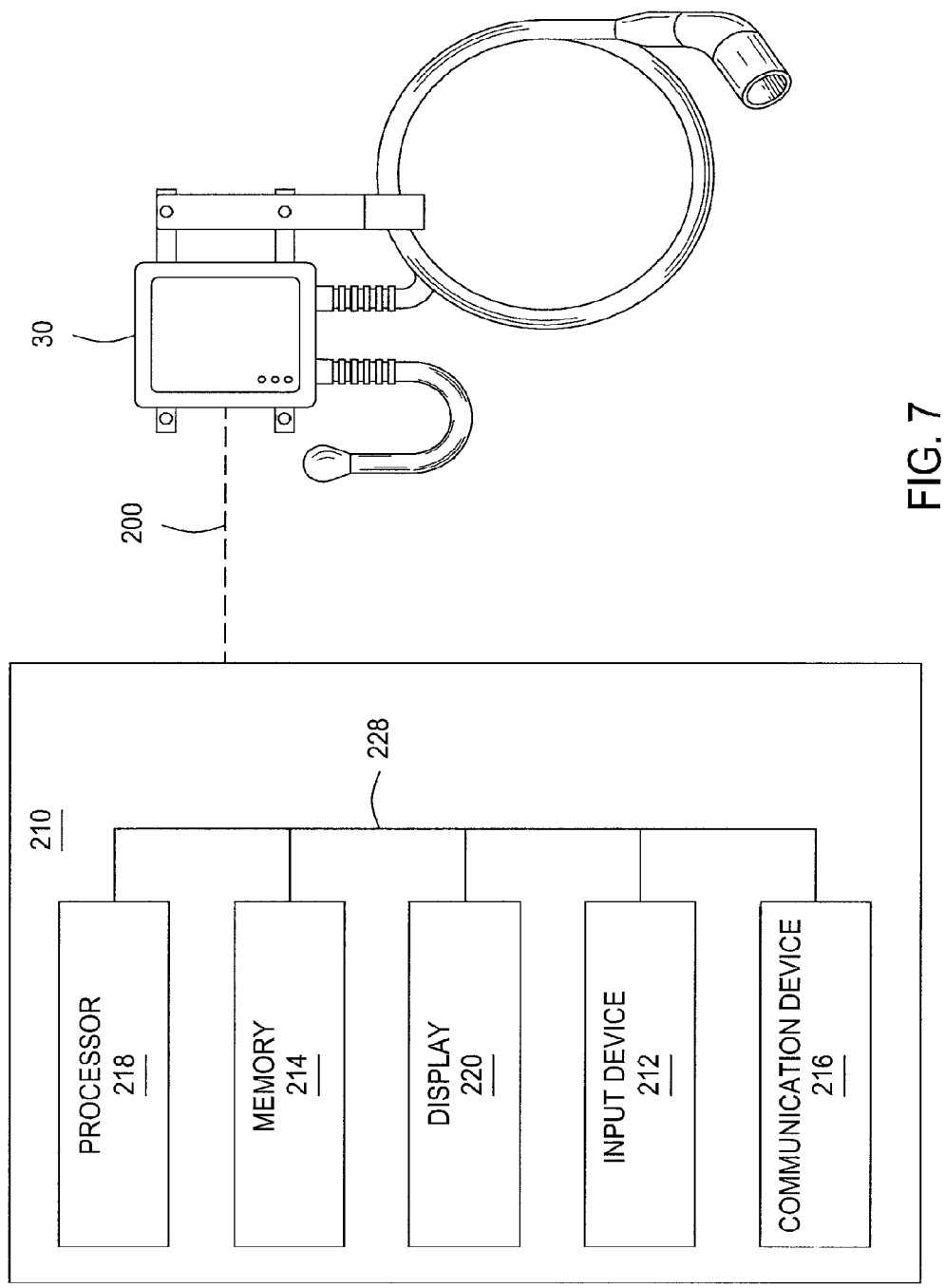
FIG. 7 is a schematic view of a system for communication between a electric vehicle supply equipment and a remote device according to another embodiment of the invention.

As mentioned herein, one embodiment of the EVSE 30 may be to communicate over a communication network 200 with a remote device 210, as shown in FIG. 7. The communication over communication network 200 can be implemented by a variety of communication protocols. EVSE 30 may have an integrated or peripheral communication device 36, through which the EVSE 30 may communicate with the remote device 210 over the communication network 200. The communication device 36 may be able to communicate via one or more communication protocols. For example, the communication device 36 may be able to connected to and communicate over a WiFi network, a radio telecommunications network, such as a GSM and/or CDMA network, a mobile broadband network, such as HSPA, EVDO, LTE, and WiMAX, or ant communication protocol described herein. The communication device 36 is not limited to any specific number or combinations of communication protocols.

Referring to FIG. 7, the remote device 210 may include input device 212, a memory 214, a communication device 216, a processor 218, and a display 220, some or all of which can be interconnected by a data link 228. The remote device 210 can be a general computing device, such as a personal computer (PC), a UNIX workstation, a server, a mainframe computer, a personal digital assistant (PDA), a cellular phone, a smart phone, a tablet, a slate, some combination of these or any other suitable computing device. Alternatively, the remote device 210 can be a specialized computing device made up of components specifically chosen to execute the functionality of the remote device 210. The remaining components can include programming code, such as source code, object code or executable code, stored on a computer-readable medium that can be loaded into the memory 214 and processed by the processor 218 in order to perform the desired functions of the remote device 210.

The processor 218 may be executed in different ways for different embodiments of the remote device 210. One embodiment is that the processor 218 is a device that can read and process data such as a program instruction stored in the memory 214. Such a processor 218 may be embodied by a programmable microcontroller.

The memory 214 may include, for example, any form or combination of volatile, non-volatile, solid state, magnetic, optical, permanent, removable, writable, rewriteable, and read-only memory. The memory 214 may contain a number of program instructions for use with the remote device 210 as discussed herein. The instructions may include methods, for example, for controlling the functions of the EVSE 30 and retrieving or receiving information from the EVSE 30. The program instructions may be configured to work with various or individual smart phone and mobile device operating systems (or operating system families, including different versions), such as iOS, Android, Chrome, BlackBerry OS, QNX, Palm OS, webOS, Windows, Windows Phone, Symbian, and the like.

Additionally, an embodiment of the remote device 210 can communicate information to a user through the display 220 and request user input through the input device 212 by way of an interactive, menu-driven, visual display-based user interface, or graphical user interface (GUI). The user may interactively input information using direct manipulation of the GUI. Direct manipulation can include the use of a pointing device, such as a mouse or a stylus, to select from a variety of selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of a mouse or buttons or keys, including for example, a trackball, a scroll wheel, a touch screen (via the display 220) or a voice-activated system.

Some options that may be selected through the input device 212 may allow the user control over the EVSE 30 and the charging of the electric vehicle. The user may select, for example, that the batteries be charged to or at a certain level or for a certain amount of time, a certain number of charges or start and stop at a certain time or at a particular event. Further, the user may select to be notified on the remote device 210 that the electric vehicle or charging is in a certain state, such as complete or faulted. The user may be able to control the EVSE 30 from the remote device 210 to control and power some of the vehicle's components while plugged in. For example, during different seasons the user may desire to start and heat or cool the vehicle as he gets ready for work in the morning so that the vehicle is comfortable when he gets in it. The remote device 210 may also instruct the EVSE 30 to control setting the radio, power seats and mirrors depending on user preferences, or lock or unlock the vehicle. Through the use of the remote device 210 to control the EVSE 30, other devices like a GPS, radar detector, and other devices that require boot or warm up periods may be powered on before the user enters the electric vehicle.

Further, the options may include instructing the EVSE 30 to run vehicle diagnostic functions, such as OBD-II, battery testing, tire pressure sensor testing, emissions testing and the like. The remote device 210 may also instruct the EVSE 30 to track the status of various batteries in the vehicles, such as which batteries have been replaced, the remaining battery life of the various batteries, the warranty information about the batteries, the type of batteries used in the vehicle (mix and match) and the like. Many other embodiments may provide for further methods, some of which will be discussed herein.

With each of the various functions of the EVSE 30 that may be controlled by the remote device 210, notifications may be sent from the EVSE 30 to the remote device for display to the user. Some such notifications may be prompted by an instruction from the remote device 210, such as an acknowledgement that a function has successfully been executed, or alternatively has failed. For example, if the user of the remote device 210 instructs the EVSE 30 via the remote device 210 to start the vehicle, and the vehicle is located somewhere where the user cannot see or hear it, the use may want confirmation indicating whether the vehicle started or not. In other instances, the remote device 210 may be notified of an event by the EVSE 30 without prompting. For example, when the vehicle is connected to the EVSE 30 it may begin to charge, and the vehicle operator may move away from the vehicle to an area where he can not see or here the vehicle or the EVSE 30. The operator then may not be able to tell when the vehicle has finished charging. The vehicle operator may use the remote device 210 to query the EVSE 30 for the vehicle charging status, or the EVSE 30 may automatically notify the operator via the remote device 210 when the vehicle has completed charging. These example are in no way limiting of the types of notifications that the remote device 210 may receive from the EVSE 30, and one skilled in the art would understand that multiple notifications may exist for every function carried out by the EVSE 30.

Similar to the communication device 36, the remote device 210 may also communicate via one or more communication protocols. To continue the example, the remote device 210 may be a cellular phone, or a smart phone, capable of communicating over a WiFi network, a radio telecommunications network, such as a GSM and/or CDMA network, and a mobile broadband network, such as HSPA, EVDO, LTE, and WiMAX. The remote device 210 is not limited to any specific number or combinations of communication protocols.

Which communication protocol may be used to communicate between the EVSE 30 and the remote device 210 may depend a few factors. One factor affecting the communication protocol selection may be the compatibility of each of the communication device 36 and the remote device 210 with the communication protocol. If both the communication device 36 and the remote device 210 are compatible with the same communication protocol, the common protocol may be the selected communication protocol to effect the communication over the communication network 200. However, it may not be necessary for the communication device 36 and the remote device 210 to support the same communication protocol because a intermediary communication device (not shown) may be used to convert data sent in protocol format to another protocol format to be received.

Another factor in selecting the communication protocol may be the proximity of the of the communication device 36 and the remote device 210 to the communication network 200. If the communication network 200 is a local network, for example a WiFi network for a home or building, and both the communication device 36 and the remote device 210 can access the local communication network 200, then the local communication network 200 may be used to effect communication between the communication device 36 and the remote device 210. The local communication network 200 may be chosen above other available networks. Reasons for selecting one available network over another may include faster communication speed, lower power consumption, reduced risk of lost or corrupted data, greater network security, and other reasons. For example, a smart phone may be able to communicate over a WiFi network and a mobile broadband network, but the WiFi network requires the smart phone to use less power, it may be firewalled and encrypted, and it may cover a smaller area. In such an example, the smart phone or the EVSE 30 may recognize that the other is connected to the WiFi network and chose to communicate of the WiFi network instead of the alternatives. In another example, a user of a smart phone may decide to manually select an available communication network 200.

Figure 8:
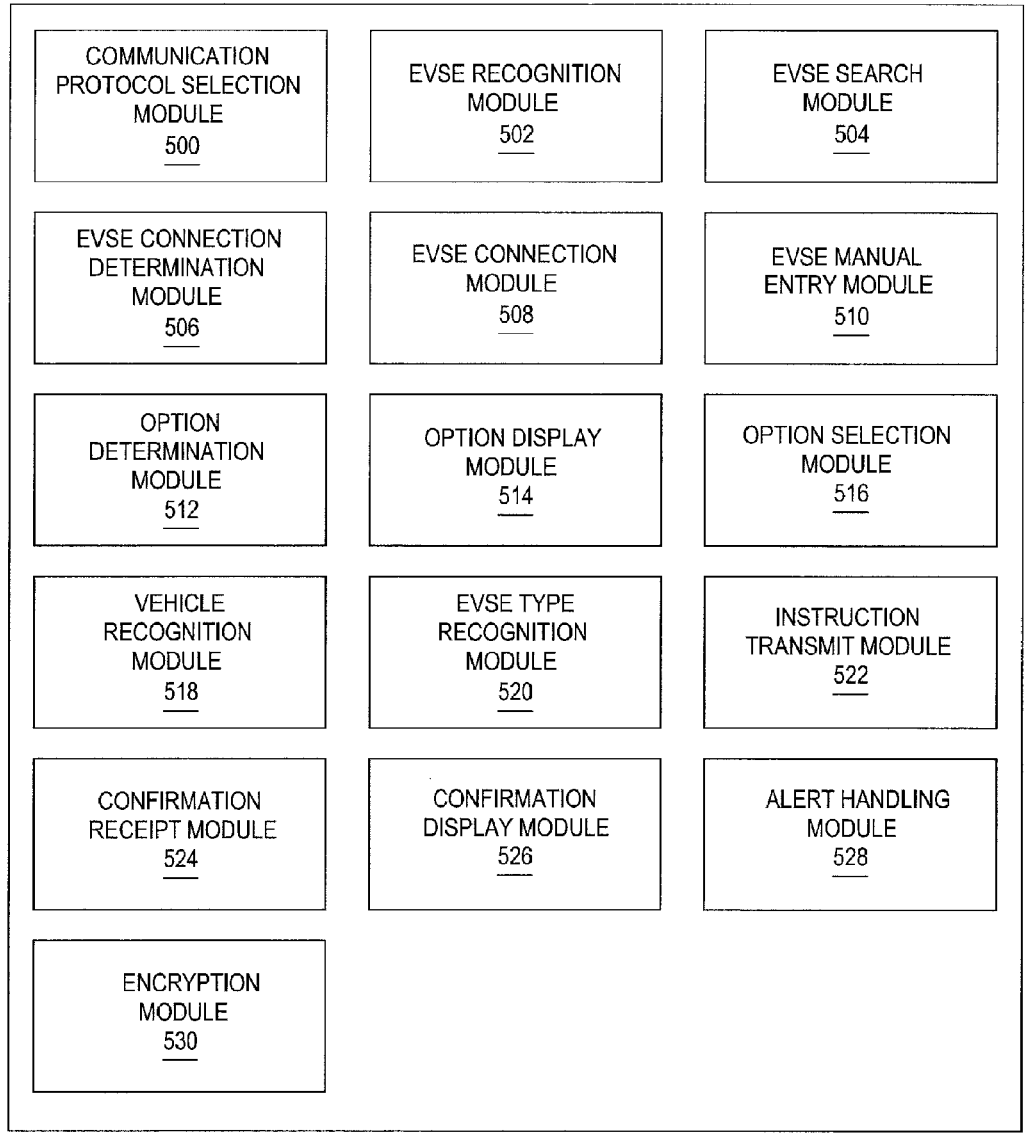
FIG. 8 is a block diagram view of a remote device for communicating with an electric vehicle supply equipment according to an embodiment of the invention.

As mentioned herein, the memory 214 may contain a number of program instructions for use with the remote device 210. Referring now to FIG. 8, the memory 214 may contain a number of instruction modules for providing various functionalities of the remote device 210. Such modules may include: a communication protocol selection module 500; an EVSE recognition module 502; an EVSE search module 504; an EVSE connection determination module 506; an EVSE connection module 508; an EVSE manual entry module 510; an option determination module 512; an option display module 514; an option selection module 516; a vehicle recognition module 518; an EVSE type recognition module 520; an instruction transmit module 522; a confirmation receipt module 524; a confirmation display module 526; an alert handling module 528; and an encryption module 530.

The communication protocol selection module 500, the EVSE recognition module 502, the EVSE search module 504, the EVSE connection determination module 506, the EVSE connection module 508, and the EVSE manual entry module 510 all relate to establishing a connection between the remote device 210 and the EVSE 30. The communication protocol selection module 500 is responsible for determining the communication protocol to use to connect to the EVSE 30 and initializing the use of the selected communication protocol. The EVSE recognition module 502 determines if any known EVSEs 30 are connected to the communication network 200 the remote device 210 has connected to via the selection and initialization made by the communication protocol selection module 500. The EVSE search module 504 executes a search for EVSEs 30 connected to the communication network 200 when no know EVSEs 30 are identified, or if none are desired to connect with. The EVSE connection determination module 506 determines whether any EVSE 30 identified, known or otherwise, is the EVSE 30 with which the remote device 210 is to connect. The EVSE connection module 508 effects the connection between the EVSE 30 and the remote device 210 based on the determination of the EVSE connection determination module 506. The EVSE manual entry module 510 allows a user to manually identify the EVSE 30 for connection when automatic connection fails or is not desired.

The option determination module 512, the option display module 514, the option selection module 516, the vehicle recognition module 518, and the EVSE type recognition module 520 each relate to determining the instructions to send to the EVSE 30. The option determination module 512 is responsible for identifying the options available for use with the EVSE 30 and the connected vehicle. The identification of options may be from a pool of options generally available for EVSEs 30, or a subset of options available from certain vehicles and/or EVSE types. Indentifying the available options may occur once after connection to an EVSE 30 or after an option selection is made further identification may be required to identify available suboptions. The option display module 514 formats the display of the options identified by the option determination module 512 and presents the options on the display 220. The formatting and presentation may occur each time the option determination module 512 is executed to present varying sets of options. The option selection module 516 receives signals representing the selection of an option on the remote device 210 and interprets the selection such that it identifies a command that results in further executing the option determination module 510 or selecting an instruction for the EVSE 30. The vehicle recognition module 518 and the EVSE type recognition module 520 identify a type of vehicle connected to the EVSE 30 and the type of EVSE 30 connected to the remote device 212, respectively. The identification may include make, model, year, software and hardware identifiers, and the like.

The instruction transmit module 522 is initiated when the option selection module 516 interprets the signal received as an instruction for the EVSE 30, and the instruction transmit module 522 communicates the instruction to the EVSE 30 via the communication network 200. If the EVSE 30 receives the instruction and executes the instruction, either to completion, or until a fault occurs, the EVSE 30 will return a confirmation of the action executed by the EVSE 30 and the result of the action. The confirmation receipt module 524 receives the confirmation from the EVSE 30 via the communication network 200. The confirmation display module 526 interprets the confirmation received from the EVSE 30 and formats the confirmation to be presented on the display 220.

In some embodiments, after a connection is established between the remote device 210 and the EVSE 30, an alert may originate from the EVSE 30 and be received by the remote device 210. Events that may trigger an alert may be preset or set by user preference in the remote device 210, or may be programmed into the EVSE 30. Some alerts may be informative of common occurrences, for example, the vehicle has commenced or completed charging, or the vehicle charge has reached a certain level. Other alerts may be informative of abnormalities, for example, the EVSE 30 has failed, the vehicle batteries are overheating, or the vehicle connection has been interrupted. In any of these examples, the EVSE 30 may send an alert which is received by the remote device 210. Upon receiving an alert the alert handling module 528 may identify the communication from the EVSE 30 as an alert and format it for display on the remote device 210. If there are options for responding to the alert, the alert handling module 528 may also display the options to the user of the remote device 210, and depending on the user's selection, instruct the remote device 210 to execute an appropriate response to the EVSE 30.

Communication between the remote device 210 and the EVSE 30 is susceptible to tampering. To address this threat, the encryption module 530 may encrypt any outgoing communications and decrypt any encrypted incoming communications. The encryption module 530 may implement symmetric or asymmetric key algorithms, it may encrypt all communications or selectively encrypt communications, and it may implement known or proprietary encryption algorithms.

Figure 9:
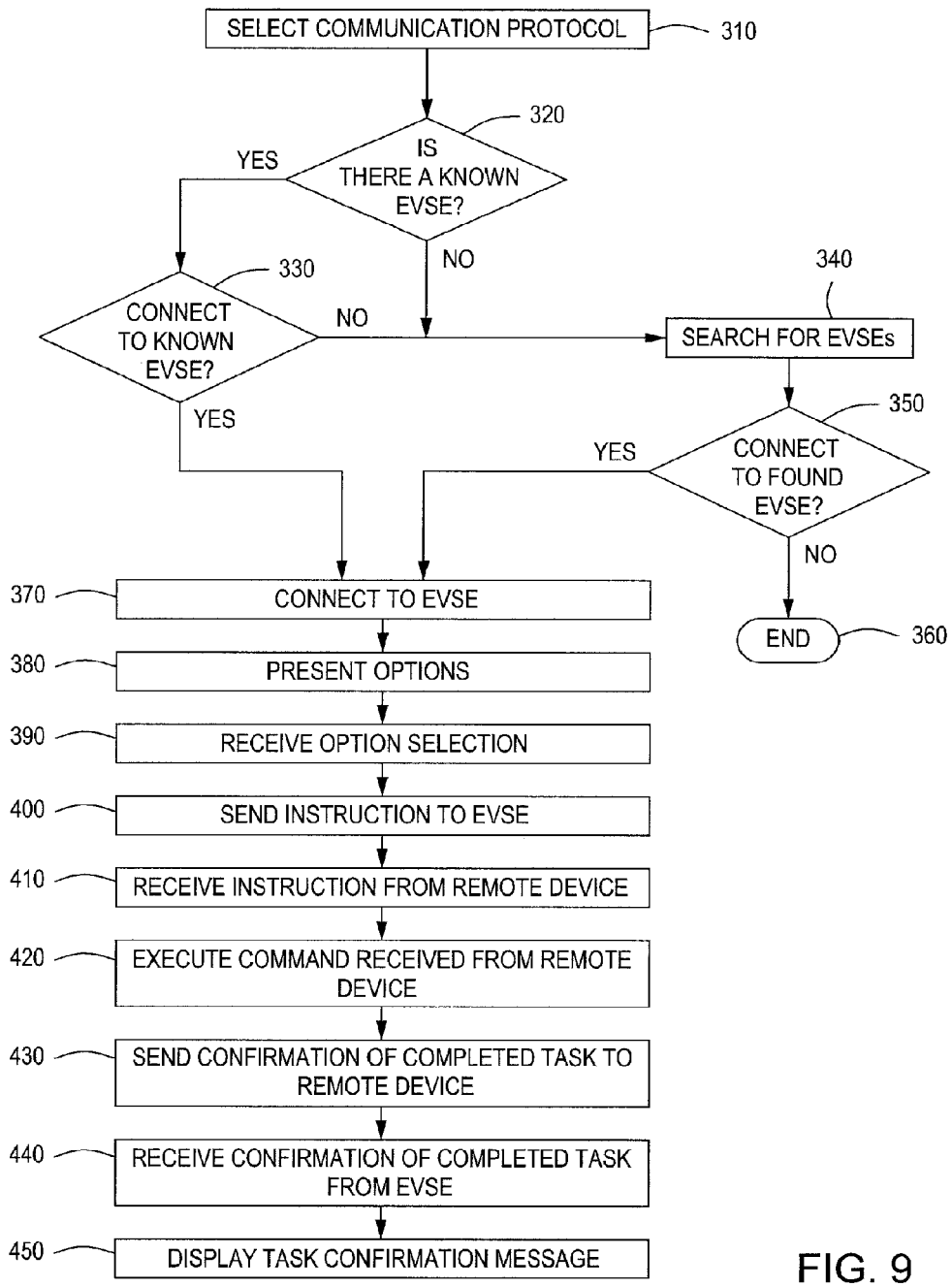
FIG. 9 illustrates a method for communication between an electric vehicle supply equipment and a remote device according to another embodiment of the invention.

Referring now to FIG. 9 the description of the method for communicating between the EVSE and the remote device 300 will be described from the perspective of the remote device 210, however one skilled in the art would recognize that individual roles of the EVSE 30 and the remote device 210 in the method described could be reversed. To begin, the remote device 210 selects a communication protocol (step 310). As described herein, the communication protocol may be selected on the basis of one or numerous factors. The remote device 210 may select a communications protocol from the communication protocols with which the remote device 210 is compatible. The remote device 210 may also be aware of the communications protocols supported by the EVSE 30 and networks to which the EVSE 30 is connected. If the remote device 210 supports a communication protocol shared by the EVSE 30, and can detect a network to which the EVSE 30 is connected, then the remote device 210 may select this communication protocol and network. This may be accomplished automatically.

Once the communication network 200 is selected, the remote device 210 may determine if there is a known EVSE 30 with which the remote device 210 may interact on the communication network 200 (step 320). If a known EVSE 30 is on the communication network 200, the remote device 210 then will decide whether to connect to the known EVSE 30 (step 330). Determining whether to connect to the known EVSE 30 may occur in a few different ways. For one, the known EVSE 30 may have been set as a preferred EVSE 30 and is set to automatically connect to that EVSE 30. Such a setting may be useful for when a person connects their vehicle to the same EVSE 30 repeatedly, like at home. Another example may include presenting the user of the remote device 210 with the option to connect to one EVSE 30 of one or more detected EVSEs 30, such as in the user's office parking garage where the user may repeatedly connect to various EVSEs 30. In this circumstance each EVSE 30 may have an identification number, similar to a parking spot number or a MAC address, so that the user may know to which EVSE 30 the vehicle is connected. In another embodiment, the remote device 210 may be able to automatically identify which of a number of EVSEs 30 is connected to the user's vehicle, and automatically connect to the proper EVSE 30. If the remote device 210 determines to connect to a known EVSE 30, then the method continue to step 370. If the remote device 210 does not find a known EVSE 30 or determines not to connect to a known EVSE 30, then the method continues to step 340.

At step 340, the remote device 210 may search for any EVSE 30 connected to the communication network 200. The results of such a search may return a prohibitively large number of EVSEs 30. The search may be limited by a number of parameters including, but not limited to, compatibility, proximity, location, and being connected to a vehicle (including any vehicle or a specific vehicle). If an EVSE 30 is found on the communication network 200, the remote device 210 then will decide whether to connect to the EVSE 30 (step 350). To determine if to connect, the user of the remote device may then select an EVSE 30 to connect to or the remote device 210 may automatically connect to the EVSE 30 as described herein in relation to connecting to a known EVSE 30. If the remote device 210, or the user, determines to connect to the EVSE 30, then the method continue to step 370. If the remote device 210 does not find an EVSE 30 or determines not to connect to the EVSE 30, or the user determines not to connect to the EVSE 30, then the method exits at step 360.

In an alternative embodiment, the remote device 210 may not search for EVSEs 30, and the user of the remote device 210 may manually enter a command to connect to a specific EVSE 30. For example, the EVSE 30 to which the user wished to connect may be saved on the remote device and the user selects the saved EVSE 30 for connecting. Alternatively, the EVSE 30 may have an identifier, such as an alphanumeric string or a MAC address, that the user may enter manually into the remote device 210. In yet another embodiment, the user may place the remote device 210 on or near the EVSE and instruct the remote device 210 to connect to the EVSE 30 in close proximity using range dependent technology such as Near Field Communication or Bluetooth.

Once the remote device 210 has established a connection with the EVSE 30 (step 370), then the remote device 210 may present a user of the remote device 210 with various options (step 380) for retrieving information from or controlling the EVSE 30. The options may be presented on the display 220 in many forms, and the user may interact with the option via the input device 212 as discussed herein. The options presented to the user may depend on the organization of the options in the GUI. For example, the organization may be in the form of a menu with top level options and categories that when selected may display related suboptions or subcategories. Alternatively, all of the options may be presented on a single screen or multiple screens which the user may scroll or page through. These option organizations may be varied, combined, or modified in numerous other ways.

The remote device 210 may then receive an option selection from the user (step 390). Upon receiving the option selection, the remote device 210 may send an instruction to the EVSE 30 (step 400). The instruction sent to the EVSE 30 may include a variety of commands. The commands may include instructions to execute an EVSE function, requests for information, or both. The instructions to execute an EVSE function may include any of the EVSE functions discussed herein, such as: the EVSE charging and charging management functions, the EVSE vehicle and charging monitoring functions, the EVSE vehicle diagnostic functions, the EVSE vehicle control functions, the EVSE safety functions, the EVSE reporting functions, the EVSE maintenance functions, the EVSE utility functions, the EVSE route planning functions, and the EVSE network connection functions. The requests for information may include any information that is available to the EVSE 30 including, for example: the state of the EVSE 30 (e.g. on, off, charging, standby, fault/error, (not) connected to a vehicle, etc.); the state of the electric vehicle charging (e.g. charging power level, charging progress and time elapsed and remaining, charging profile, charging settings, charging metrics (i.e. efficiency and cost), charging events (i.e. completed, a certain charging level attained, stopped or interrupted), etc.); the state of the electric vehicle (e.g. vehicle diagnostic information, battery charge level, battery condition, battery temperature during charging, battery life, battery statistics, whether certain vehicle systems and engine are on or off, settings for certain vehicle systems, etc.); information from the electric utility provider (e.g. peak/off-peak times and costs, current costs, usage and savings comparisons, usage statistics, bills, etc.), including home utility providers, such as solar panels, wind turbines, fuel cells, etc.; driving conditions information (e.g. weather, traffic, effect on efficiency of driving the electric vehicle); route planning (e.g. distances, types of roadways, availability of EVSEs 30 on the way to a destination, electric vehicle driving dynamics for the route (i.e. what to expect in terms of battery usage, ratio of battery usage and other fuel in a hybrid), etc.); EVSE and vehicle manufacturer information and updates (e.g. relevant news, tips, software updates, etc).

Upon receiving a command from the remote device 210 (step 410), the EVSE 30 executes the command (step 420). Executing the command from the remote device 210 may require that the EVSE 30 change setting within itself, interact with the connected electric vehicle, or retrieve information from other sources. Often times, executing the commands may result in effects that are not detectable by the user of the remote device 210, and other times executing the device may require that information be sent to the remote device 210, in either instance the EVSE 30 should send a confirmation of the completed task to the remote device 210 (step 430). The confirmation may be a message indicating whether a task was completed by the EVSE 30 or if the EVSE 30 failed to complete the task. In other instances the confirmation may just be the return of information requested by the remote device 210.

The remote device 210 receives the confirmation from the EVSE 30 (step 440) and displays an appropriate message to the user (step 450). The message displayed to the user may be textual, graphical, audible, tactile, or a combination of any of these features. For example, if the EVSE 30 sends a confirmation that charging is complete, the remote device may vibrate and/or make a sound to alert the user of the message that is further being displayed on the display 220. The audible portion may also state the contents of the message, such as by stating "charge complete." A visual portion of the display may include a textual and/or graphical representation that charging is complete, such as text stating "charging complete," or an image of a full battery or full fuel gauge.

It has been described that a single EVSE 30 may be connected to multiple electric vehicles at once. Therefore, the method described herein may be implemented such that the option to select one or more of multiple vehicles connected to the EVSE 30 may be presented to the user and the selection may be received by the remote device 210 as part of step 380. The vehicles may be identified to the user by vehicle specific information, such as any single or combination of make, model, year, VIN, license plate number, etc. Alternatively, a customized tag may be assigned to each vehicle, such as "Dad's car," "guest," "Eleanor," etc. The option selections received by the remote device 210 and the commands transmitted to the EVSE 30 will be applied for the vehicle(s) selected by the user.

It has also been conceived that the remote device 210 may connect to, control, and receive/retrieve inform from a variety of EVSEs 30 including those from different manufactures. The remote device 210 may identify the type of EVSE 30 and from that type, determine what functionality is available to the remote device 210. Further, it has been conceived that the method be executed as part of a preloaded or downloaded smart phone application, or a smart phone app, designed for repeatedly connecting to a specific EVSE 30, such that the remote device 210 connects to the same EVSE 30 each time the smart phone app is implemented. In such an embodiment, some of the method steps of method for communicating between the EVSE and the remote device 300 may be not need to be implemented.

Figure 10:
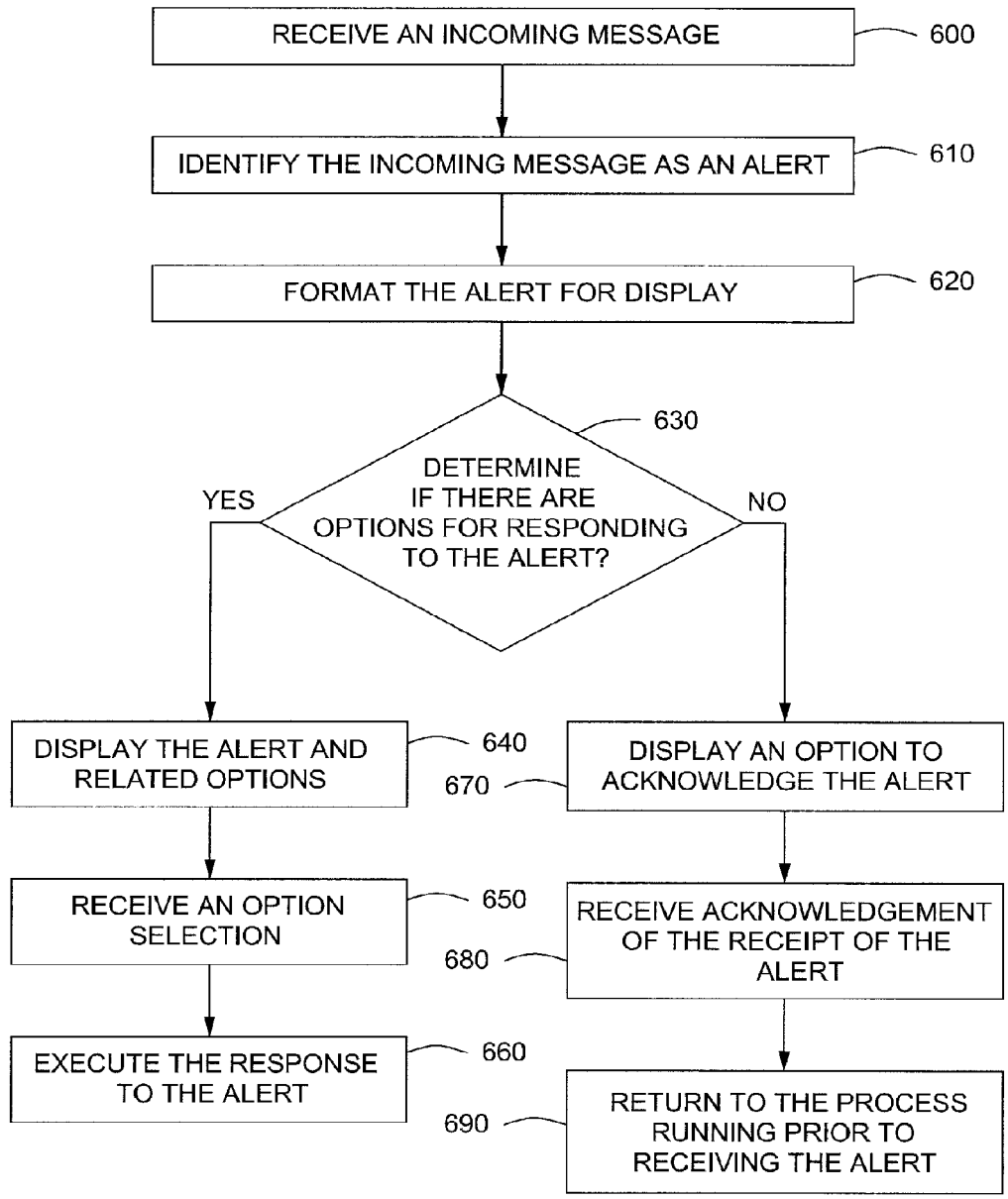
FIG. 10 illustrates a method for handling alerts from an electric vehicle supply equipment to a remote device according to another embodiment of the invention.

In one embodiment of the described method, as illustrated in FIG. 10, at any point after establishing a connection (step 370) between the remote device 210 and the EVSE 30, the remote device 210 may receive an alert from the EVSE 30 (step 600). Upon receiving an alert the alert handling module 528 may identify the communication from the EVSE 30 as an alert (step 610) and format the alert for display (step 620) on the remote device 210. The alert handling module 528 may determine if there are options for responding to the alert (step 630). Options for responding to the alert may be stored on the remote device 210 and matched with the alert by the alert handling module 528, or they may be part of the alert transmission received from the EVSE 30. Once it is determined that there are options for responding to the alert (step 630) the alert handling module 528 may also display the options (step 640) to the user of the remote device 210. An option selection may be received (step 650) by the alert handling module 210, and depending on the user's selection, instruct the remote device 210 to execute an appropriate response to the EVSE 30 (step 660). If, on the other hand, there are no associated options for the alert, the alert handling module may display an option to acknowledge receipt of the alert (step 670), receive the acknowledgment of receipt of the alert (680), and return to the previous function prior to receiving the alert (step 690).

In another embodiment, the encryption module 530 may be executed at various points in the methods described herein. The encryption module 530 may be executed prior to any information being sent from the remote device 210 to encrypt the information such that only the intended receiving device, such as the EVSE 30, may decrypt the information and read it. The encryption module 530 may also be executed following receipt of any message by the remote device 210 from any other device, such as the EVSE 30. Upon receiving a message, the encryption module 530 may determine if the received message is encrypted, what sort of encryption has been applied to the message, and may decrypt the message for use by the remote device 210.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for remotely communicating with an electric vehicle supply equipment (EVSE) for charging electric vehicles via a communication network, comprising:
    a processor configured to execute instruction modules and the processor is configured to cause power to be provided to a vehicle at selectively a first power level and selectively at a second power level;
    a memory configured to store the instruction modules;
    a communication interface configured to transmit a command to the EVSE and receive a confirmation from the EVSE over the communication network;
    an input device configured to receive an input or a selection; and
    a display configured to display the selection or the confirmation, wherein the instruction modules include:
        an EVSE connection module configured to connect the communication interface to the EVSE over the communication network; and
        an instruction transmit module configured to send the command from the communication interface to the EVSE over the communication network.

2. The apparatus of claim 1, wherein the instruction modules further comprise an EVSE connection determination module configured to determine whether a connection to the EVSE is desired.

3. The apparatus of claim 1, wherein the instruction modules further comprise an EVSE recognition module configured to automatically identify a known EVSE connected to the communication network.

4. The apparatus of claim 1, wherein the instruction modules further comprise an EVSE search module configured to automatically identify EVSEs connected to the communication network.

5. The apparatus of claim 1, wherein the instruction modules further comprise an EVSE manual entry module configured to allow a manual selection or an entry of an EVSE identifier to indicate a desired EVSE for connection.

6. The apparatus of claim 1, wherein the instruction modules further comprise an option determination module configured to identify options available for controlling the EVSE and requesting information from the EVSE.

7. The apparatus of claim 6, wherein the instruction modules further comprise an option selection module configured to interpret the input or selection received by the input device into commands for the EVSE and commands for the option determination module.

8. The apparatus of claim 6, wherein the instruction modules further comprise a vehicle recognition module configured to identify the electric vehicle connected to the EVSE, and wherein the option determination module is further configured to identify options available for controlling the EVSE and requesting information from the EVSE based on a vehicle identification information.

9. The apparatus of claim 6, wherein the instruction modules further comprise an EVSE type recognition module configured to identify a type of the EVSE, and wherein the option determination module is further configured to identify options available for controlling the EVSE and requesting of information from the EVSE based on the type of the EVSE.

10. The apparatus of claim 1, wherein the instruction modules further comprise an alert handling module configured to recognize a message received by the apparatus as an alert, identify options for handling the alert, display the alert and the options, and instruct the apparatus of a response to the alert based on receiving an option selection.

11. The apparatus of claim 1, wherein the instruction modules further comprise an encryption module configured to encrypt an outgoing message and decrypt an incoming message.

12. The apparatus of claim 1, wherein the first power level is a nominal 120 volts and the second power level is a nominal 220 or 240 volts.

13. The apparatus of claim 3, wherein the first power level is a nominal 120 volts and the second power level is a nominal 220 or 240 volts.

14. The apparatus of claim 4, wherein the first power level is a nominal 120 volts and the second power level is a nominal 220 or 240 volts.

15. The apparatus of claim 1, wherein the apparatus is a wireless device.

16. The apparatus of claim 1, wherein the selection includes an amount of time for the EVSE to charge batteries of electric vehicles.

17. The apparatus of claim 1, wherein the selection includes controlling a component of the electric vehicle to turn on.

18. The apparatus of claim 17, wherein the component heats or cools the electric vehicle.

19. The apparatus of claim 1, wherein the selection includes setting power seats or mirrors of the electric vehicle.

20. The apparatus of claim 1, wherein the selection includes locking or unlocking of the electric vehicle.

\* \* \* \* \*